(12) United States Patent
Damron

(10) Patent No.: US 8,555,034 B2
(45) Date of Patent: Oct. 8, 2013

(54) EXECUTION OF VARIABLE WIDTH VECTOR PROCESSING INSTRUCTIONS

(75) Inventor: Peter Carl Damron, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 963 days.

(21) Appl. No.: 12/638,671

(22) Filed: Dec. 15, 2009

(65) Prior Publication Data
US 2011/0145543 A1    Jun. 16, 2011

(51) Int. Cl.
*G06F 17/16* (2006.01)
*G06F 9/302* (2006.01)

(52) U.S. Cl.
USPC ........................................................ 712/210

(58) Field of Classification Search
None
See application file for complete search history.

(56) References Cited

U.S. PATENT DOCUMENTS

| | | | | |
|---|---|---|---|---|
| 5,146,599 | A | * | 9/1992 | Kojima et al. ..................... 712/7 |
| 5,513,366 | A | * | 4/1996 | Agarwal et al. ................. 712/22 |
| 5,991,531 | A | * | 11/1999 | Song et al. ....................... 703/26 |
| 6,266,758 | B1 | * | 7/2001 | van Hook et al. ................. 712/2 |

OTHER PUBLICATIONS

Shipnes,J., Graphics Processing with the 88110 RISC Microprocessor, 1992, IEEE, pp. 169-174.*
Lambiotte et al., "The Solution of Tridiagonal Linear Systems on the CDC STAR-100 Computer," ACM Transactions on Mathematical Software, vol. 1, No. 4, pp. 308-329, Dec. 1975.
Narayan, Sumit, "Supercomputers: Past, Present, and the Future," www.acm.org/crossroads, vol. 15, No. 4, pp. 7-10, Summer 2009.

* cited by examiner

*Primary Examiner* — Eric Coleman
(74) *Attorney, Agent, or Firm* — Polsinelli PC

(57) ABSTRACT

A processing unit executes a vector width instruction in a program and the processing unit obtains and supplies the width of an appropriate vector register that will be used to process variable vector processing instructions. Then, when the processing unit executes variable vector processing instructions in the program, the processing unit processes the variable vector processing instructions using the appropriate vector register with the instructions having the same width as the appropriate vector register. The width that the processing unit obtains may be less than an actual width of the appropriate vector register and may set by the processing unit. In this way, many different vector widths can be supported using a single set of instructions for vector processing. New instructions are not required if vector widths are changed and processing units having vector registers of differing widths do not require different code.

20 Claims, 23 Drawing Sheets

Program

```
void vector_add (double *a, double *b, restrict double *c, int n)
{ int i;

for (i = 0; i < n; i++)
    { c[i] = a[i] +b[i];

}

}
```

400A

Stripmined Program for a Fixed Width of Four

```
void vector_add_simd4 (double *a, double *b, restrict double *c, int n)
{
    int i, j;

for (i = 0; i < (n/4); i++)
    {
        for (j = 0; j < 4; j++)
        {
            c[i*4 +j] = a[i*4 +j] +b[i*4 +j];           401B

}
    } int m = n − ( (n/4) * 4);

for (i = m; i < n; i++)
    {
        c[i] = a[i] +b[i];

Stripmined Program for Variable Width

```
void vector_add_vect (double *a, double *b, restrict double *c, int n)
{
        int i, j;
        int new_n, v_size, ii;
        v_size = get_DVS_register();
        new_n = n/v_size;

for (i = 0; i < new_n; i++)
        {
                ii = i * v_size;

for (j = 0; j < v_size; j++)
                {
                        c[ii + j] = a[ii + j] +b[ii + j];           401C
                }

} int m = n − ( new_n * v_size);

for (i = m; i < n; i++)

EXECUTION OF VARIABLE WIDTH VECTOR PROCESSING INSTRUCTIONS

FIELD OF THE INVENTION

This invention relates generally to vector processing, and more specifically to executing variable width vector processing instructions.

BACKGROUND

Single Instruction, Multiple Data (SIMD) is a technique employed to achieve data level parallelism. SIMD operations reduce computing time by performing the same operation on a series of values instead of performing the operation on each value in the series sequentially. Programs may take advantage of SIMD when the same operation is applied to a large number of data points, such as in graphics processing where the same operation is applied to a number of data points representing pixels on a display screen. Typically, these SIMD operations form each result vector register element in parallel by performing an operation on the corresponding elements of two input vector registers, but some vector operations may use only one input vector register or may use both vector registers and scalar registers.

Computing devices commonly utilize vector processing instructions to perform SIMD operations on a series of data values stored in a vector register. These vector processing instructions are included in the instruction set of the processing unit of the computing device. When the processing unit of the computing device executes a vector processing instruction, the processing unit decodes the vector processing instruction and performs the appropriate operation on the appropriate vector register.

Generally, the processing unit must know the width of the vector when processing the vector processing instruction. The processing unit must also generally have access to a vector register that the processing unit can use to process the vector processing instruction. Typically, the vector processing instruction specifies the length of the vector. However, this means that the instruction set for the processing unit must include vector processing instructions for each width of vector that the processing unit will be able to perform SIMD operations upon. In order for a processing unit that supports 64 wide vector processing instructions to support 128 wide vector processing instructions, such as when a 128 wide vector register is added to a new implementation of the processing unit, new instructions must be added to the instruction set for the processing unit. The larger the instruction set for a processing unit, the longer it will take the processing unit to decode and perform instructions. Further, because the vector processing instructions specify a particular vector width, code written for a first processing unit that supports vector processing instructions of a certain vector width cannot be executed by another processing unit that does not support vector processing instructions of that vector width.

SUMMARY

A processing unit executes a vector width instruction in a program. In response to executing the vector width instruction, the processing unit obtains and supplies the width of an appropriate vector register that the processing unit will use to process variable vector processing instructions. Then, when the processing unit executes variable vector processing instructions in the program, the processing unit processes the variable vector processing instructions using the appropriate vector register with the variable vector processing instructions having the same width as the appropriate vector register. In this way, a single set of instructions can be utilized for vector processing while supporting many different vector widths. Changes to vector widths do not require new instructions and different code is not required for processing units having vector registers of differing widths.

The processing unit may obtain the width of the appropriate vector register from a vector width register. The width that the processing unit obtains from the vector width register may be less than an actual width of the appropriate vector register. The processing unit may be operable to set the width stored in the vector width register.

As part of processing the variable vector processing instructions, the processing unit may align a vector stored in the appropriate vector register. The variable vector processing instructions may include a variety of different types of instructions. Such different types of instructions may include, but are not limited to, vector add instructions, vector subtract instructions, vector multiply instructions, vector divide instructions, vector and instructions, vector or instructions, vector xor instructions, vector rotate instructions, vector load instructions, vector store instructions, vector element extraction instructions, scalar expansion instructions, and/or vector reduction instructions.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The present disclosure may be better understood, and its numerous features made apparent to those skilled in the art by referencing the accompanying drawings.

FIG. 4B is a diagram illustrating the code of FIG. 4A modified by stripmining for processing using a vector register of a fixed width of four;

FIG. 4C is a diagram illustrating the code of FIG. 4A modified by stripmining for processing using a vector register of variable width, in accordance with an embodiment of the present disclosure;

DETAILED DESCRIPTION

The present disclosure describes systems and methods that enable execution of variable width vector processing. When a processing unit executes a vector instruction of a given width, the processing unit responds by obtaining and supplying the width of the appropriate vector register. The processing unit may obtain the width of the appropriate vector register from a vector size register. Then, when the processing unit executes variable vector processing instructions, the processing unit processes the vector processing instructions as having a width of the obtained width of the vector register.

As the present disclosure enables utilization of a single set of instructions for vector processing, regardless how many different widths of vectors are supported. If the width of one or more vectors that are supported changes, then new instructions for the instruction set are not required. Further, a single set of code containing variable vector processing instructions can be executed by multiple different processing devices configured in accordance with this disclosure, even if the multiple different processing devices do not support vector processing instructions of the same width.

Figure 1:
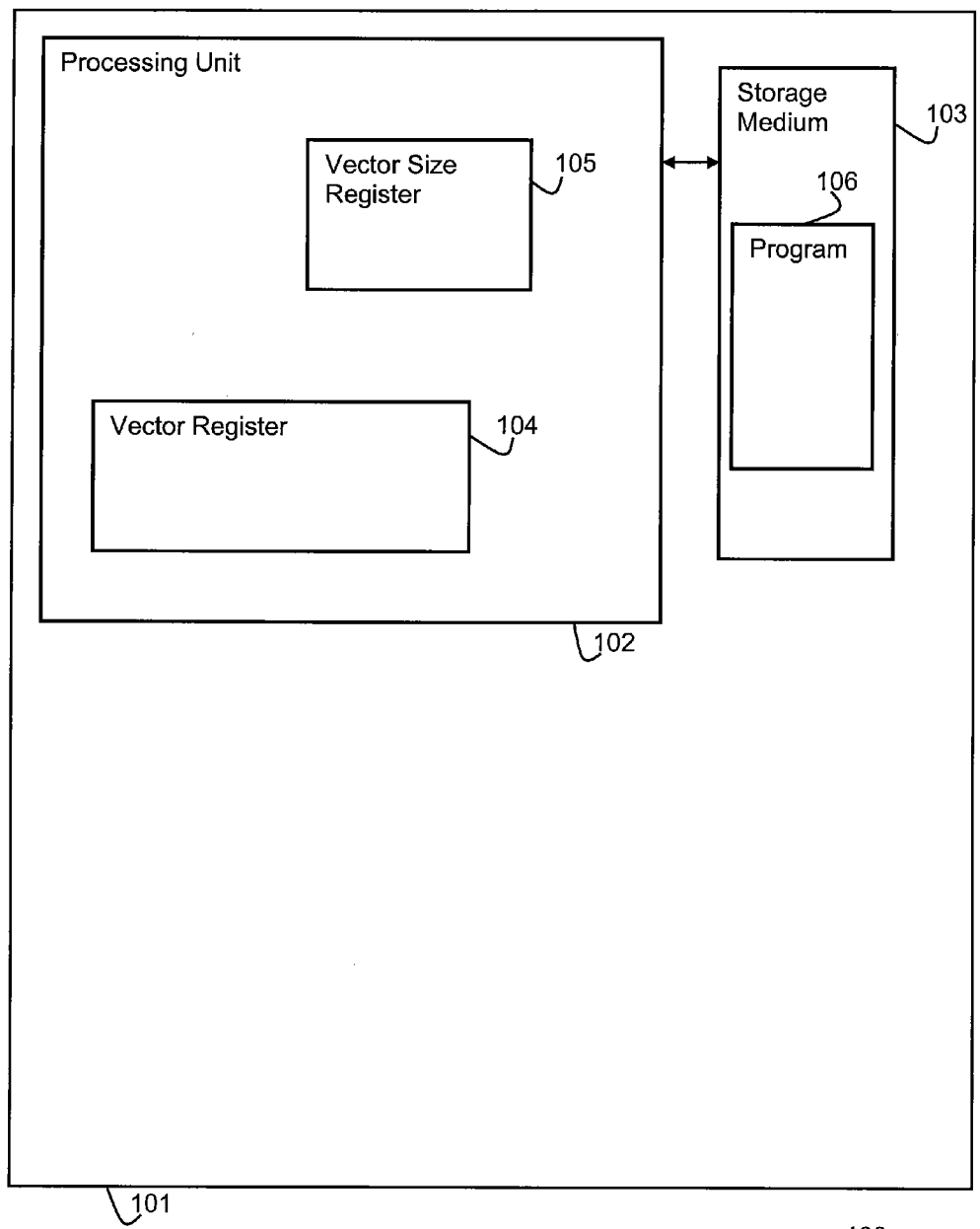
FIG. 1 is a block diagram illustrating a system 100 for executing variable width vector processing instructions, in accordance with an embodiment of the present disclosure.

FIG. 1 illustrates a system 100 for executing variable width vector processing instructions, in accordance with an embodiment of the present disclosure. The system 100 involves a computing device 101 that includes a processing unit 102 and a tangible machine-readable storage media 103. The processing unit 102 includes one or more vector registers 104 and one or more vector size registers 105. The vector register 104 stores one or more vectors during execution of vector processing instructions by the processing unit 102. The vector size register 105 stores the width of the vector register 104. The tangible machine-readable storage media 103 is operable to store one or more programs 106.

The processing unit 102 executes the code of the program 106. During execution of the program 106, the processing unit 102 obtains the width of the vector register 104 from the vector size register 105 and supplies it in response to executing one or more vector width instructions in the program 106. The processing unit 102 then executes one or more variable vector processing instructions in the program 106 and processes the variable vector processing instruction with a vector width of the width obtained of the vector register 104. In short, the processing unit 102 processes variable vector processing instructions in the code 106 as having the same width as the vector register 104 even though the program 106 was not written for a computing device with a vector register having the width of the vector register 104. A different computing device configured in accordance with the present disclosure would also be able to execute the program 106 despite having a vector register with a different width than the vector register 104.

Although the vector register 104 is illustrated as a single register, in various implementations the vector register 104 may be made up of a number of registers that the processing unit 102 treats as a single vector register. Further, in one or more implementations the processing unit 102 treats the vector register 104 as a vector register when processing vector instructions and as a non-vector register when processing non-vector instructions.

In various implementations, the value in the vector size register 105 may be less than the actual width of the vector register 104. In such implementations, the processing unit 102 may be operable to set the value in the vector size register 105. For example, the vector register 104 may have a width of thirty-two. However, the processing unit 102 may set the vector size register 105 as sixteen. Thus, processing unit 102 would process variable vector processing instructions as having a width of sixteen and would use the vector register 104 as vector register with a width of sixteen.

The variable vector processing instruction may include a plurality of different vector processing instructions. For example, the variable vector processing instruction may perform various operations on a vector stored in the vector register 104 such as a vector load instruction to load a vector from memory into the vector register 104, a vector store instruction to store a vector from the vector register 104 to memory, a vector rotate instruction to re-order the elements of a vector stored in the vector register 104, a vector element extraction instruction to derive the value of one or more elements of a vector stored in the vector register 104, a scalar expansion instruction to create a vector in the vector register 104 based on replicating a scalar value, and/or a vector reduction instruction to reduce a vector stored in the vector register 104 to a scalar value. By way of another example, the variable vector processing instruction may perform various operations utilizing a vector stored in the vector register 104 and another vector such as a vector add instruction to add another vector to a vector stored in the vector register 104, a vector subtract instruction to subtract another vector from a vector stored in the vector register 104, a vector multiplication instruction to multiply another vector by a vector stored in the vector register 104, a vector divide instruction to divide another vector by a vector stored in the vector register 104, a vector and instruction to perform a logical and operation on another vector and a vector stored in the vector register 104, a vector or instruction to perform a logical or operation on another vector and a vector stored in the vector register 104, and/or a vector xor instruction to perform a logical xor operation on another vector and a vector stored in the vector register 104. The vector processing instruction may specify processing on one or more vectors that are not aligned and the processing unit 102 may align the one or more vectors as part of processing the vector processing instruction. The processing unit 102 may support variable vector processing instructions that operate on vectors with different element types, for example some vector processing instructions may operate on single byte integer vector elements and other vector processing instructions may operate on double precision floating-point vector elements of 8 bytes each. In such cases, the value of the vector size register 105 may be supplied as the number of bytes in the vector register 104 and may be adjusted by dividing by the size of the elements to obtain the number of elements of that type storable in the vector register 104.

While the system 100 has been described as including computing device 101, a single processing unit 102, and a single storage medium 103, it will be understood that system 100 is illustrative and that multiple computing devices 101 (which may be communicably coupled), multiple processing units 102, and/or multiple storage media 103 may be utilized without departing from the scope of the present disclosure. The processing unit 102 may also include one or more memories and/or cache memories, one or more sets of condition codes, and one or more sets of floating-point states that are communicably connected to the vector register 104. Further, the processing unit 102 may include a facility to conditionally execute instructions in the program 106 based on the condition codes, the floating-point state, and/or the values stored in the vector register 104.

The tangible machine-readable storage medium 103 may include, but is not limited to, magnetic storage media (e.g., floppy diskette), optical storage media (e.g., CD-ROM); magneto-optical storage media, read only memory, random access memory, erasable programmable memory (e.g., EPROM and EEPROM), flash memory, and other types of memory and media suitable for storing electronic information. The computing device 101 may also include (not shown) one or more input and/or output devices (including, but not limited to displays, keyboards, mice, printers, scanners, and so forth), one or more buses (including, but not limited to, universal serial bus, small computer system interface, and so forth), and/or one or more communication components (including, but not limited to, modems, Ethernet adapters, wireless Ethernet adapters, and so forth).

Figure 2:
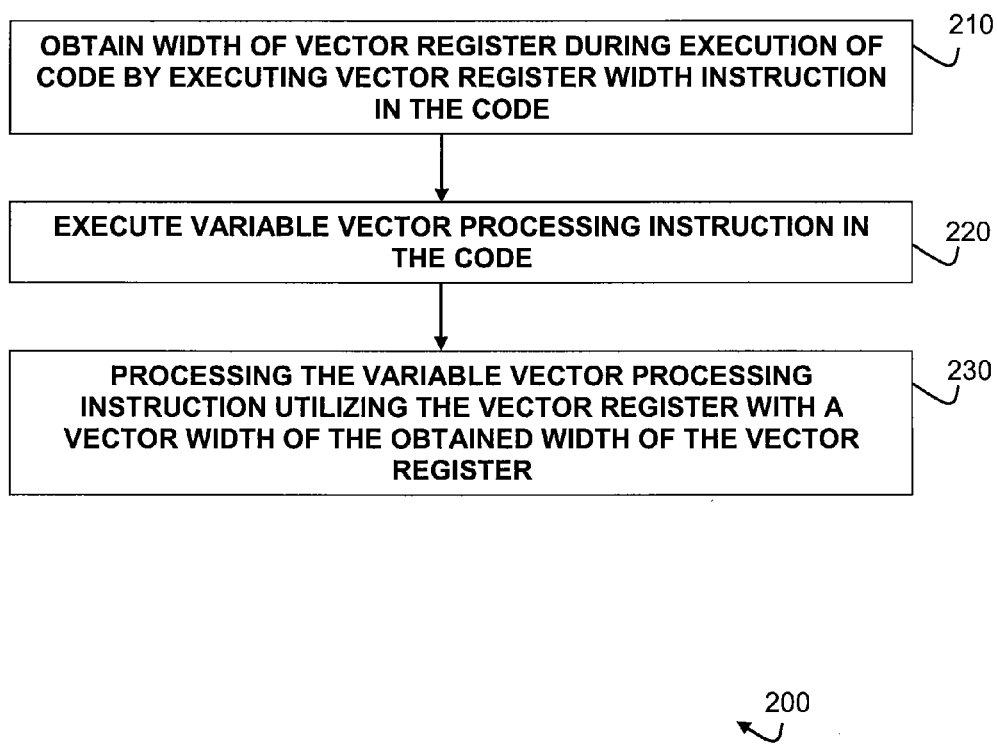
FIG. 2 is a method diagram illustrating a method for executing variable width vector processing instructions, which may be performed by the system of FIG. 1, in accordance with an embodiment of the present disclosure.

FIG. 2 illustrates a method 200 for executing variable width vector processing instructions, which may be performed by the system 100, in accordance with an embodiment of the present disclosure. The method 200 may comprise a computer-implemented method. The computer-implemented method may be performed by a processing unit, such as the processing unit 102, executing one or more sets of instructions included in a computer program product stored in the tangible machine-readable medium 103.

In a first operation 210, the processing unit 102 obtains the width of the vector register 104 during execution of the code of the program 106 by executing one or more vector register width instructions in the code. The processing unit 102 may obtain the width of the vector register 104 from the vector size register 105. The vector register width instruction may have been inserted in the code by a compiler during compilation of the code.

In a second operation 220, the processing unit 102 executes one or more variable vector processing instructions in the code. The variable vector processing instruction may include one or more vector load instructions, vector store instructions, vector rotate instructions, vector element extraction instructions, scalar expansion instructions, vector reduction instructions, vector add instructions vector subtract instructions, vector multiply instructions, vector divide instructions, vector and instructions, vector or instructions, and/or vector xor instructions. The variable vector processing instruction may have been inserted in the code by a compiler and/or assembler during compilation of the code.

In a third operation 230, the processing unit 102 the processing unit 102 processes the variable vector processing instruction utilizing the vector register 104. The processing unit 102 processes the variable vector processing instruction as having a vector width that is the same as the obtained width of the vector register 104.

Subsequent to the processing unit 102 executing the variable vector processing instruction, the code may be executed by another computing device that has a vector register with a different width than the vector register 104. Despite the fact that the other computing device has a vector register with a different width than the vector register 104, the other computing device is still be able to execute the code.

Figure 3:
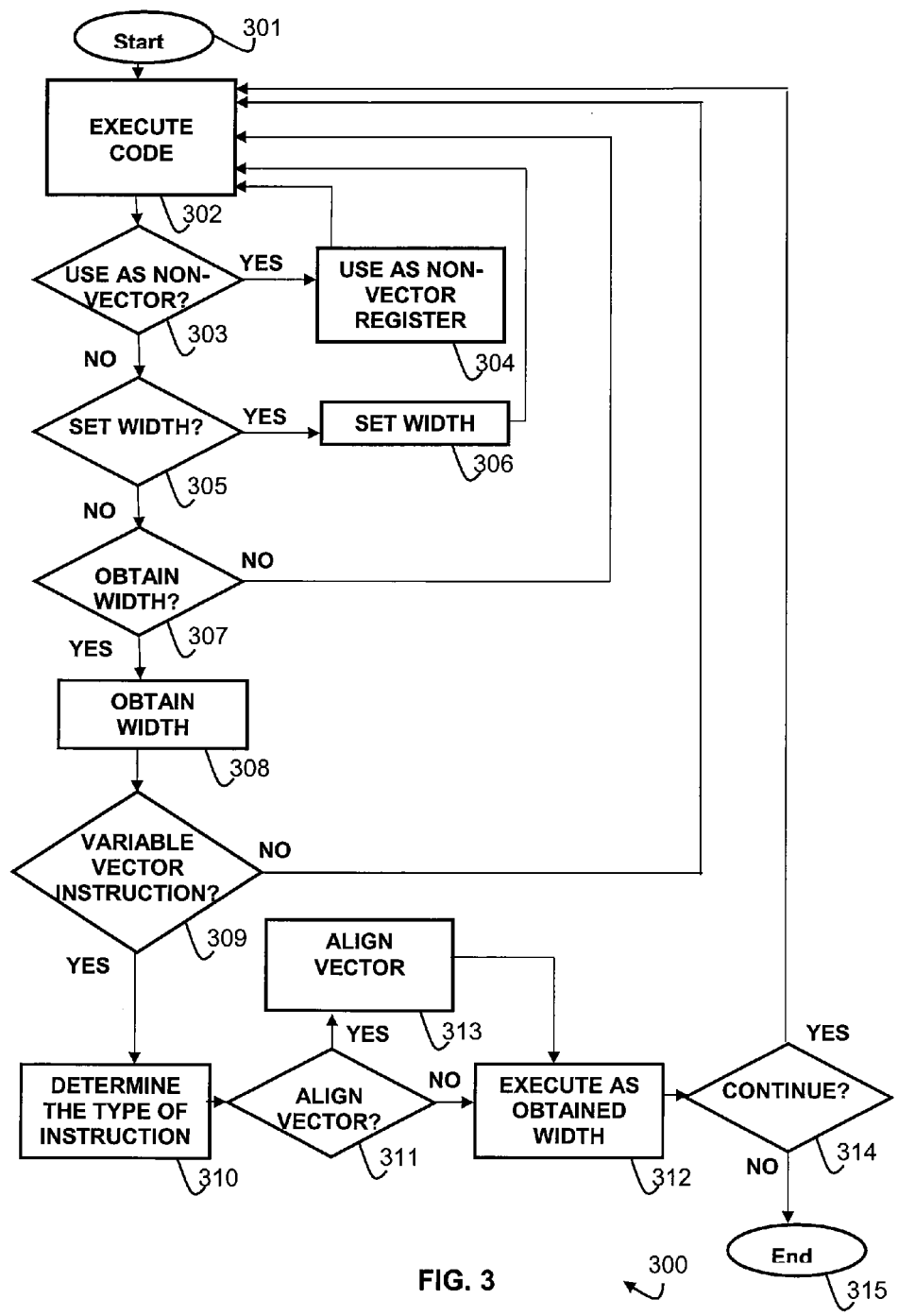
FIG. 3 is a flow chart illustrating an example flow of an implementation of the method of FIG. 2, in accordance with the present disclosure.

FIG. 3 illustrates the flow 300 of an example performance of method 200 by an example implementation of a computing device such as computing device 101. The flow starts at block 301 and proceeds to block 302. At block 302, the processing unit 102 begins executing the code of the program 106 and the flow proceeds to block 303. At block 303, the processing unit 102 determines whether an executed instruction specifies use of the vector register 104 as a non-vector register. If the processing unit 102 has executed an instruction that specifies use of the vector register 104 as a non-vector register, the flow proceeds to block 304. If the processing unit 102 has not executed an instruction that specifies use of the vector register 104 as a non-vector register, the flow proceeds to block 305. At block 304, the processing unit 102 processes the instruction using the vector register 104 as a non-vector register and the flow proceeds to block 302.

At block 305, the processing unit 102 determines whether an executed instruction specifies setting the width of the vector register 104 stored in the vector size register 105. If the processing unit 102 has executed an instruction that specifies setting the width stored in the vector size register 105, the flow proceeds to block 306. If the processing unit 102 has not executed an instruction that specifies setting the width stored in the vector size register 105, the flow proceeds to block 307. At block 306, the processing unit 102 sets the width stored in the vector size register 105 and the flow proceeds to block 302.

At block 307, the processing unit 102 determines whether an executed instruction is a vector register width instruction. If a vector register width instruction has been executed, the flow proceeds to block 308. If a vector register width instruction has not been executed, the flow proceeds to block 302. At block 308, the processing unit 102 obtains the width of the vector register 104 from the vector size register 105 and the flow proceeds to block 309.

At block 309, the processing unit 102 determines whether an executed instruction is a variable vector processing instruction. If a variable vector processing instruction has been executed, the flow proceeds to block 310. If a variable vector processing instruction has not been executed, the flow proceeds to block 302. At block 310, the processing unit 102 determines the type of variable vector processing instruction that has been executed and the flow proceeds to block 311.

At block 311, the processing unit 102 determines whether one or more vectors need to be aligned in order to process the variable vector processing instruction. If one or more vectors need to be aligned, the flow proceeds to block 313. If one or more vectors do not need to be aligned, the flow proceeds to block 312. At block 312, the processing unit 102 processes the variable vector processing instruction as a vector processing instruction using the vector register 104 having the obtained width and the flow proceeds to block 314. At block 313, the processing unit 102 aligns the one or more vectors and the flow proceeds to block 312.

At block 314, the processing unit 102 determines whether more of the code remains to be executed. If more of the code remains to be executed, the flow proceeds to block 302. If more of the code does not remain to be executed, the flow proceeds to block 315 and ends.

Figure 4A:
FIG. 4A is a diagram illustrating an example pseudo code of a program that adds two vectors and stores the result in a third vector.

FIG. 4A illustrates example pseudo code 400A of a program in C source code that adds two vectors and stores the result in a third vector. As illustrated, vector_add takes references to array a, array b, array c, and integer n as arguments. Integer n specifies the length of the vectors. The code utilizes a for loop to add each respective element of the vector of array a and the vector of array b and store the result in the respective element of the vector of array c. Outside of the vector_add section of code (not shown), array a, array b, and n have been assigned values. Array a has been assigned values to store a vector with the elements: 1, 1, 1, 1, 2, 2, 2, 2, 3, 3, 3, 3, 4, 4, 4, and 4. Array b has been assigned values to store a vector with the elements: 5, 5, 5, 5, 6, 6, 6, 6, 1, 1, 1, 1, 5, 5, 5, and 5. Integer n has been assigned a value of 16. Thus, after execution of the code 400A, array c will store a vector with the elements 6, 6, 6, 6, 8, 8, 8, 8, 4, 4, 4, 4, 9, 9, 9, and 9.

FIG. 4B illustrates code 400B modified from the code 400A by stripmining for processing using a vector register of a fixed width of four. Stripmining refers to a compilation optimization technique that modifies the code of a program to allow one or more portions to be executed using vector processing instructions. This technique reduces processing time by replacing a series of linearly executed instructions with vector instructions that perform multiple instructions in parallel. As illustrated, compared to the code 400A, the code within the for loop has been replaced with an inner for loop 401B that will execute four times for each pass of the outer for loop. This enables the inner for loop 401B to be performed by three vector instructions (not shown), a four-wide vector load instruction, a four-wide vector add instruction, and a four-wide vector store instruction, rather than performing the four iterations as written.

As the first for loop performs the vector add operation four elements at a time, in cases where the width of the vectors is not evenly divisible by four, a number of vector elements will remain to be added after the first for loop. This number would be the remainder of the width of the vectors divided by four. The second for loop in the second half of the code accounts for such cases by adding the remaining elements that were not processed by the first for loop. As the vectors in this example include sixteen elements, the vectors are evenly divisible by four and no vector elements would remain after execution of the first for loop for the second for loop to add.

Because the code 400B adds four elements of the vectors in parallel rather than individually, the code 400B requires less time for a computing device with a four element vector register to execute than the code 400A. However, as the code 400B is written to be executed using four-wide vector processing instructions, the code 400B cannot be executed by a computing device that has a vector register with a width other than four such as the computing device 501A illustrated in FIG. 5A which has a vector register 504A with a width of eight or the computing device 601A illustrated in FIG. 6A which has a vector register 604A with a width of sixteen.

FIG. 4C illustrates code 400C modified from the code 400A by stripmining for processing using a vector register of a variable width. As illustrated, compared to the code 400A and similar to the code 400B, the code within the for loop has been replaced with an inner for loop 401C. However, the first for loop is preceded by an instruction that obtains the size of the vector register 104 and assigns that size to the variable v_size. The inner for loop 401C executes a number of times equaling the number stored in v_size, enabling the inner for loop 401C to be performed by three vector instructions, a vector load instruction, a vector add instruction, and a vector store instruction, rather than performing the iterations as written. The size of the three vector instructions is the number stored in v_size. In another implementation, the inner for loop may use 4 vector instructions: a vector load instruction to load a first location from memory into a first vector register, a vector load instruction to load a second location from memory into a second vector register, a vector add instruction to add the first vector register and second vector register into a third vector register, and a store instruction to store the third vector register to a third location in memory.

As the first for loop performs the vector add operation v_size elements at a time, in cases where the width of the vectors is not evenly divisible by v_size, a number of vector elements will remain to be added after the first for loop. This number would be the remainder of the width of the vectors divided by v_size. The second for loop in the second half of the code accounts for such cases by adding the remaining elements that were not processed by the first for loop. In another implementation, the second for loop may be executed with vector instructions by changing the vector size register 105 to the value corresponding to the number of elements remaining to be computed.

Because the code 400C adds v_size elements of the vectors in parallel rather than individually, the code 400C requires less time for a computing device with a four element vector register to execute than the code 400A. Also, as the code 400C is written to be executed using variable vector processing instructions, the code 400C can be executed by a computing device configured in accordance with the present disclosure that has a vector register with any width.

Figure 5A:
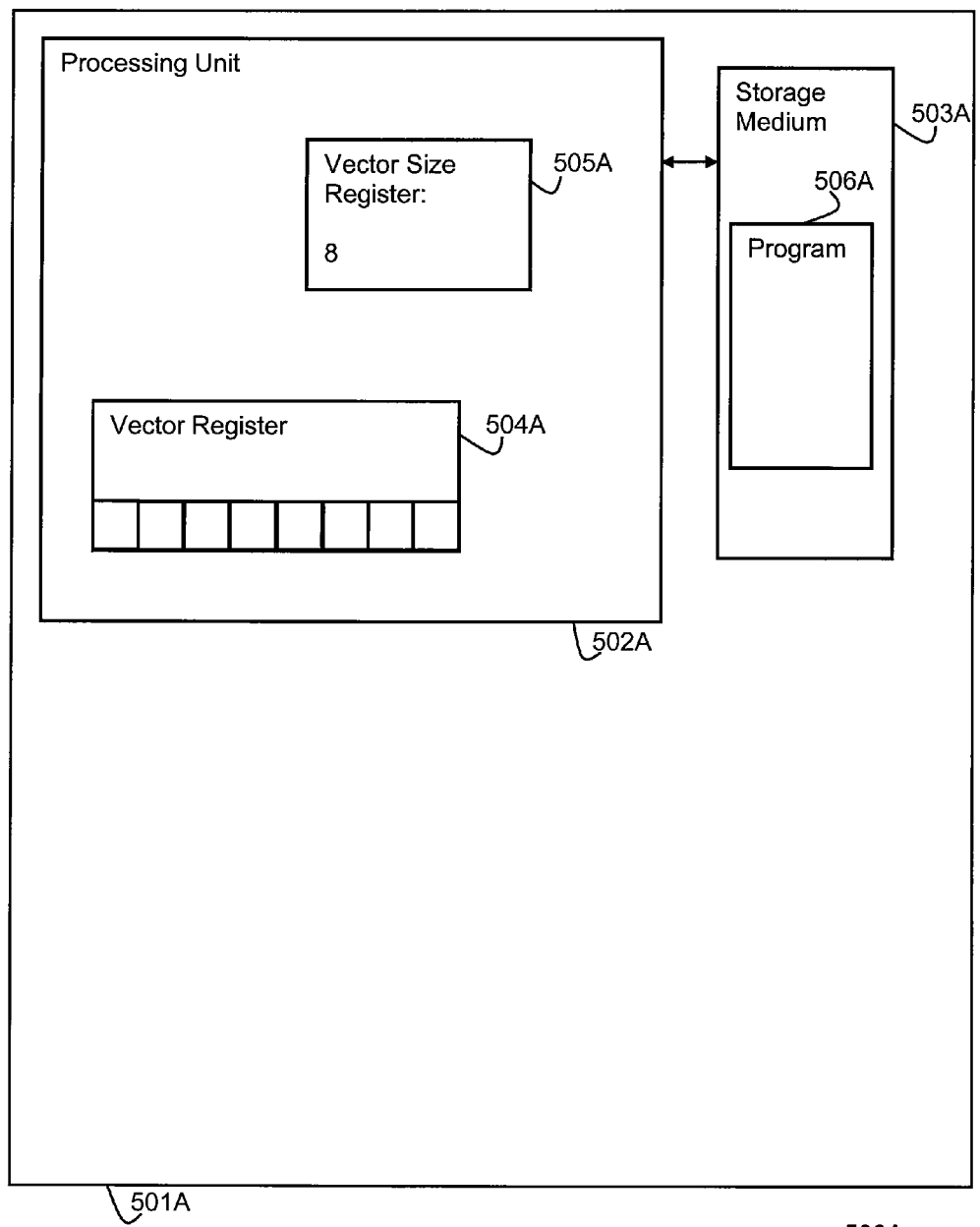
FIG. 5A is a block diagram illustrating a first example system 500A executing the code of FIG. 4C, in accordance with an embodiment of the present disclosure.

FIGS. 5A-5E are block diagrams illustrating a first sample system 500A-500E executing the code 400C. As illustrated in FIG. 5A, the system 500A involves a computing device 501A that includes a processing unit 502A and a tangible machine-readable storage media 503A. The processing unit 502A includes a vector register 504A and a vector size register 505A. One or more vector registers 504A store one or more vectors during execution of vector processing instructions by the processing unit 502A. The vector size register 505A stores the width of the vector register 504A. As illustrated, the size of the vector register 504A is eight and the vector size register 505A stores the width of eight of the vector register 504A. The tangible machine-readable storage media 503A is operable to store a program 506A which is the code 400C.

Figure 5B:
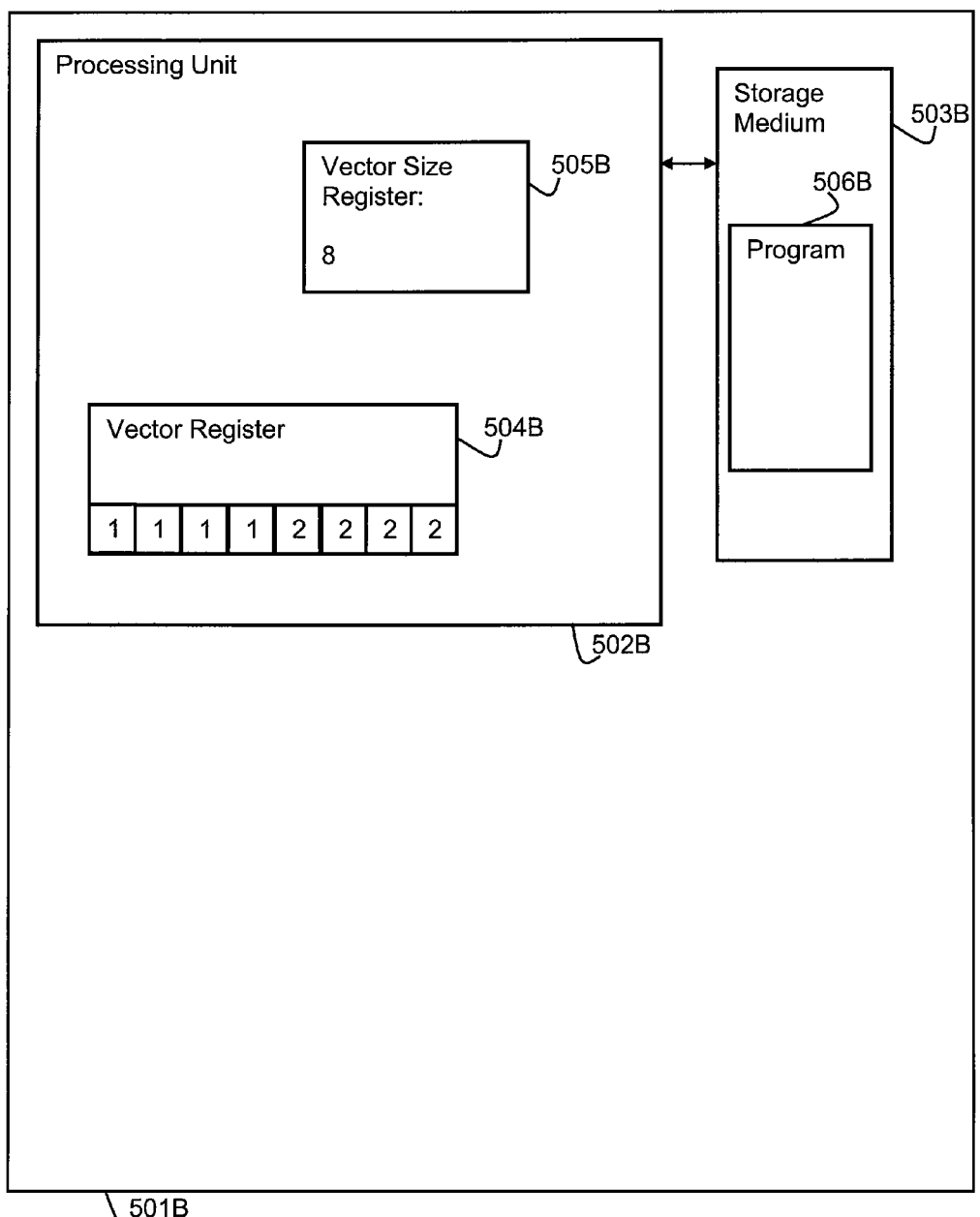
FIG. 5B is a block diagram illustrating the first example system 500B executing the code of FIG. 4C after loading the first eight elements of array a into the vector register, in accordance with an embodiment of the present disclosure.
Figure 5C:
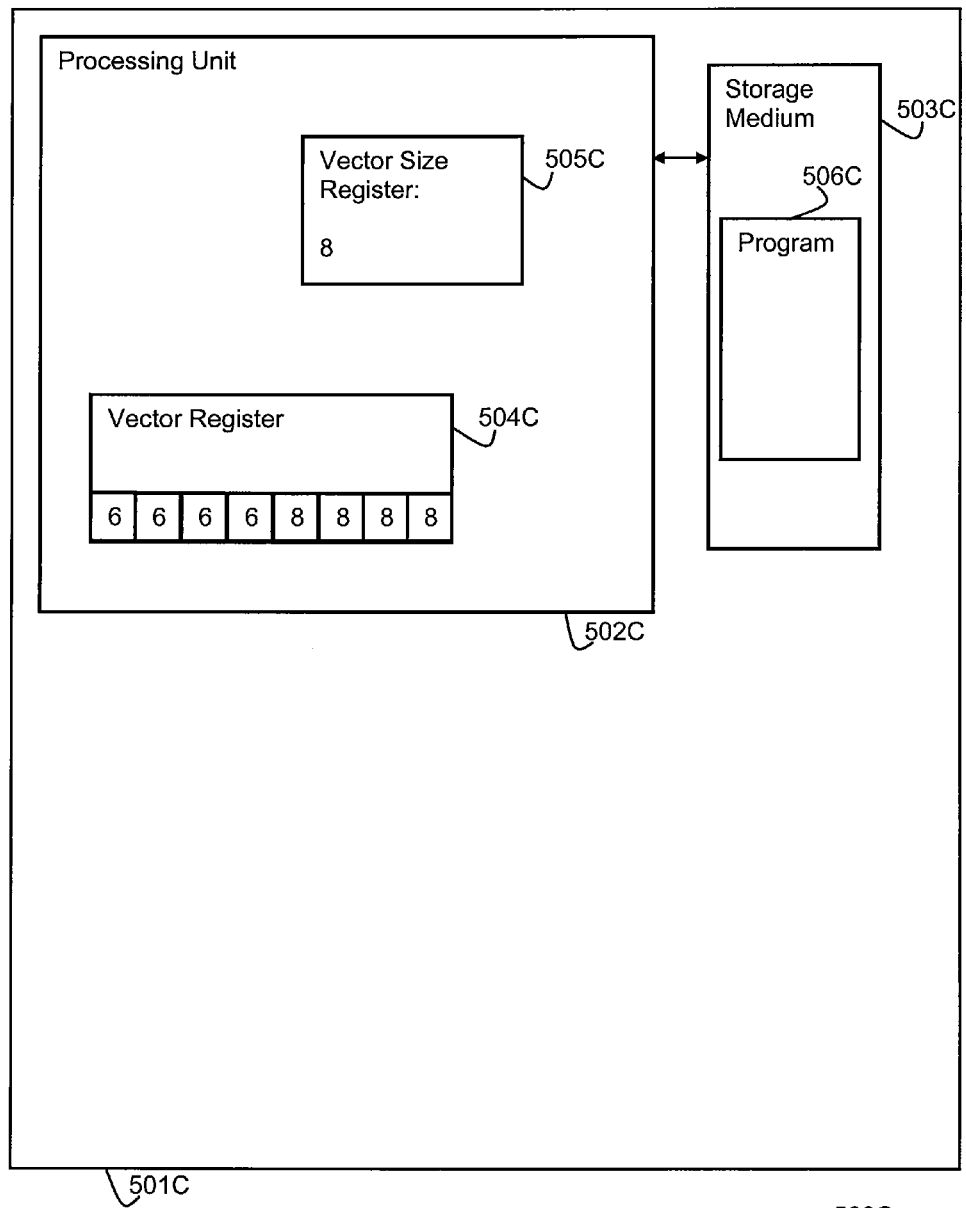
FIG. 5C is a block diagram illustrating the first example system 500C executing the code of FIG. 4C after adding the first eight elements of array b to the vector register, in accordance with an embodiment of the present disclosure.
Figure 5D:
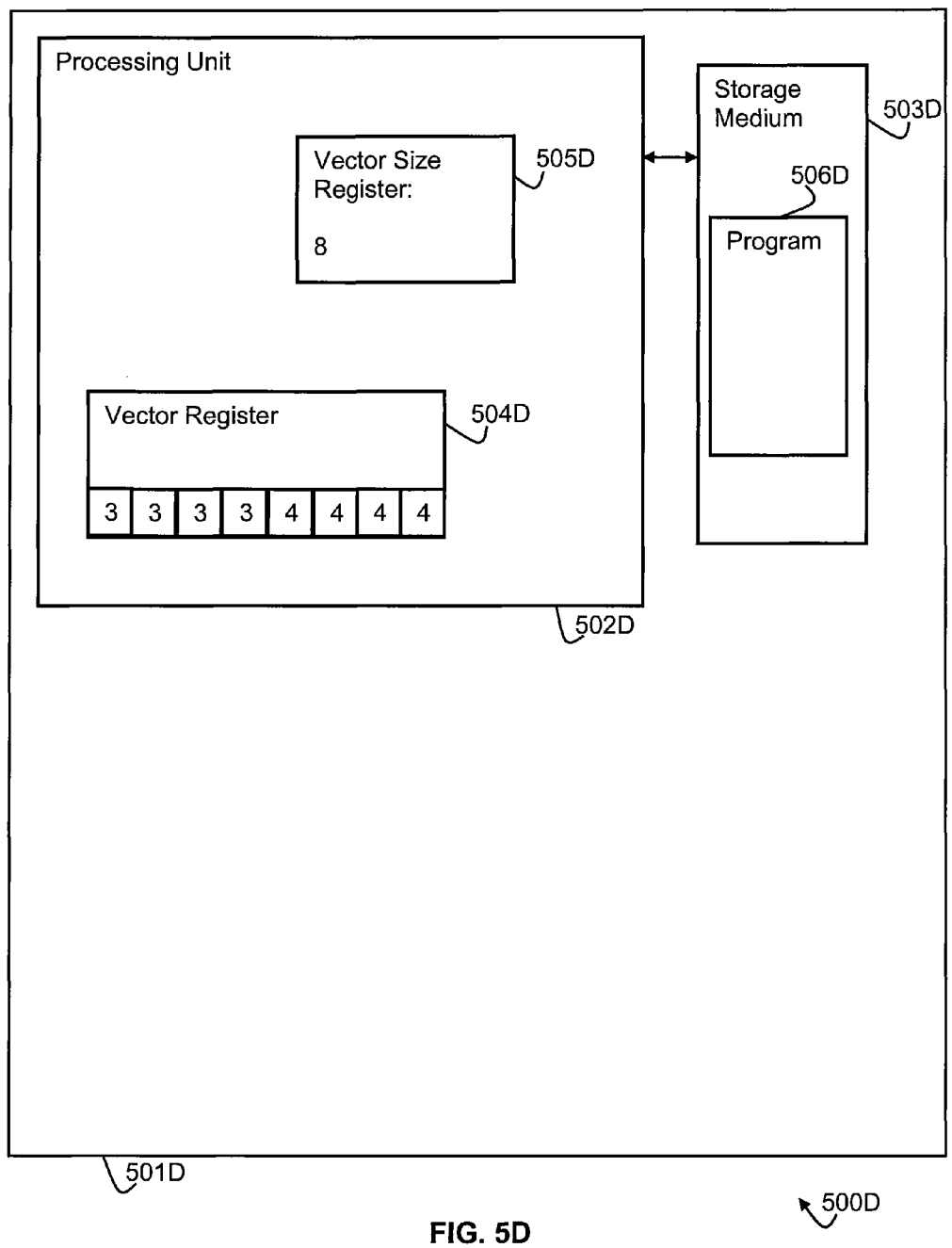
FIG. 5D is a block diagram illustrating the first example system 500D executing the code of FIG. 4C after loading the final eight elements of array a into the vector register, in accordance with an embodiment of the present disclosure.
Figure 5E:
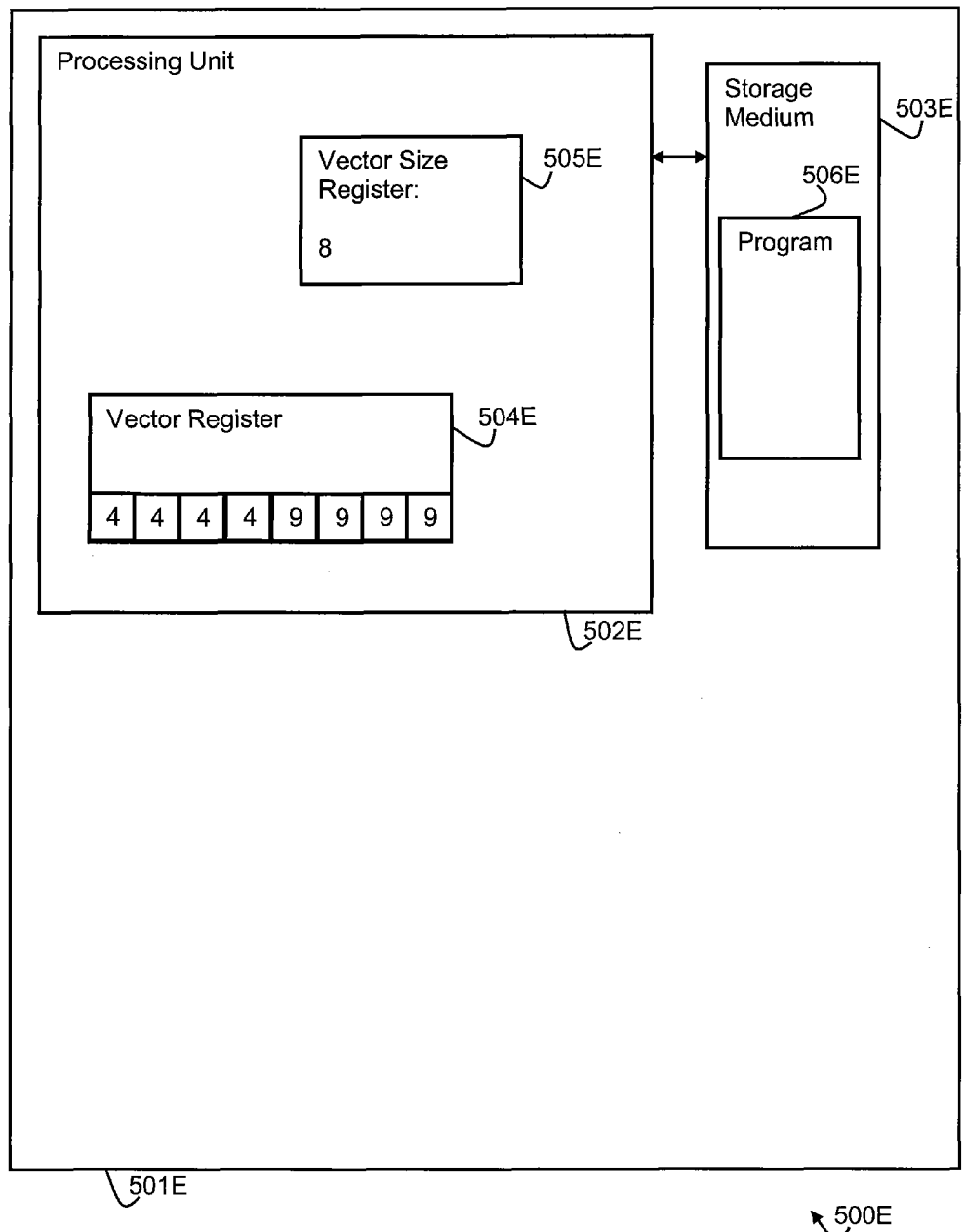
FIG. 5E is a block diagram illustrating the first example system 500E executing the code of FIG. 4C after adding the final eight elements of array b to the vector register, in accordance with an embodiment of the present disclosure.

The processing unit 502A executes the code 400C. The processing unit 502A executes the instruction that obtains the width, eight, of the vector register 504A as stored in the vector size register 505A and assigns that width to the variable v_size. The processing unit 502A then performs the inner for loop using vector processing instructions of width eight. As illustrated in FIG. 5B, the processing unit 502B loads the first eight elements of array a into the vector register 504B. Next, as illustrated in FIG. 5C, the processing unit 502C adds the first eight elements of array b to the vector register 504C before storing the resulting values to array c. Then, as illustrated in FIG. 5D, the processing unit 502D loads the last eight elements of array a into the vector register 504D. Next, as illustrated in FIG. 5E, the processing unit 502E adds the last eight elements of array b to the vector register 504E before storing the resulting values to array c. As the vectors in this example include sixteen elements, the vectors are evenly divisible by eight and no vector elements would remain after execution of the first for loop. Thus, no vector elements remain for the second for loop to add.

Figure 6A:
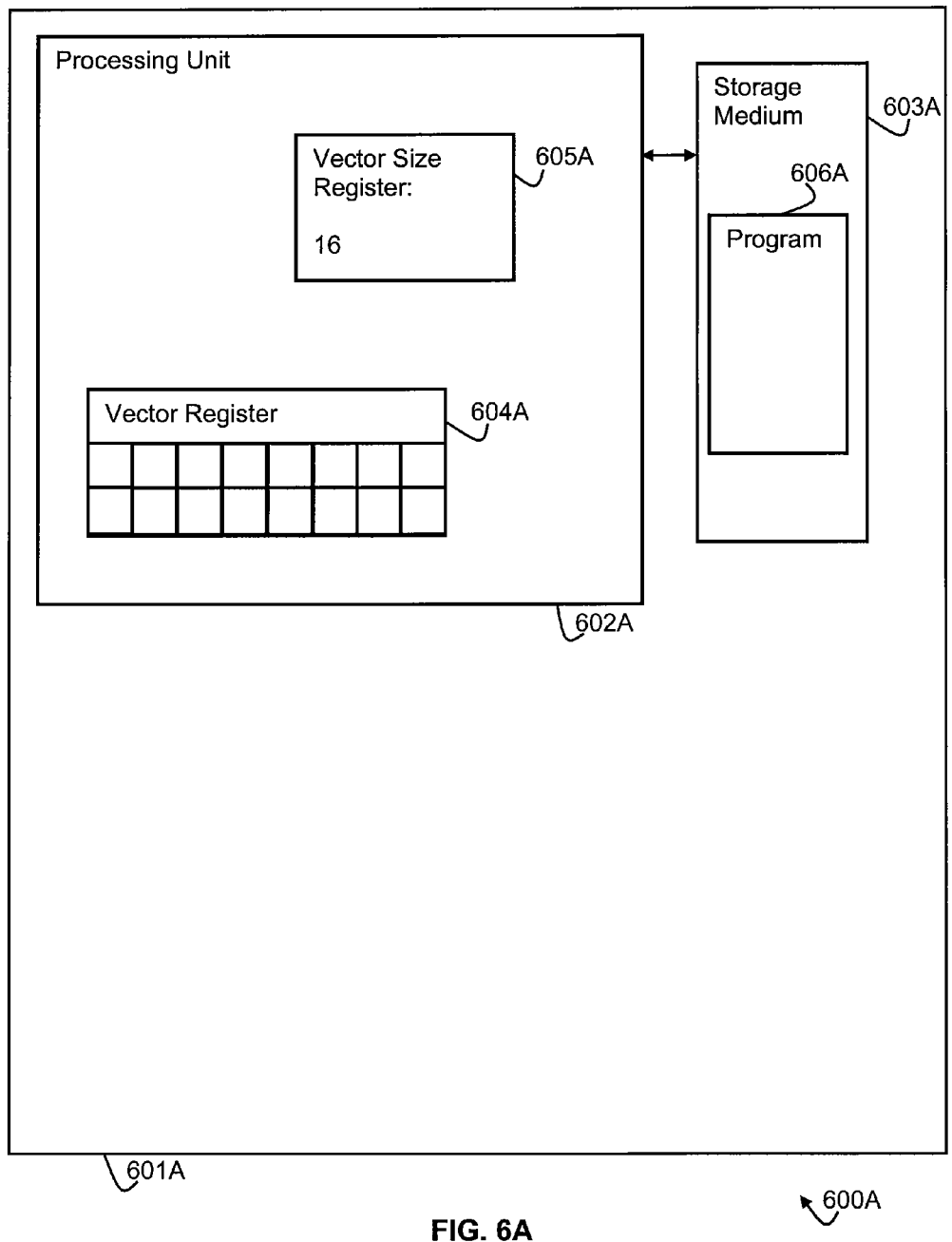
FIG. 6A is a block diagram illustrating a second example system 600A executing the code of FIG. 4C with a vector width of sixteen, in accordance with an embodiment of the present disclosure.
Figure 6B:
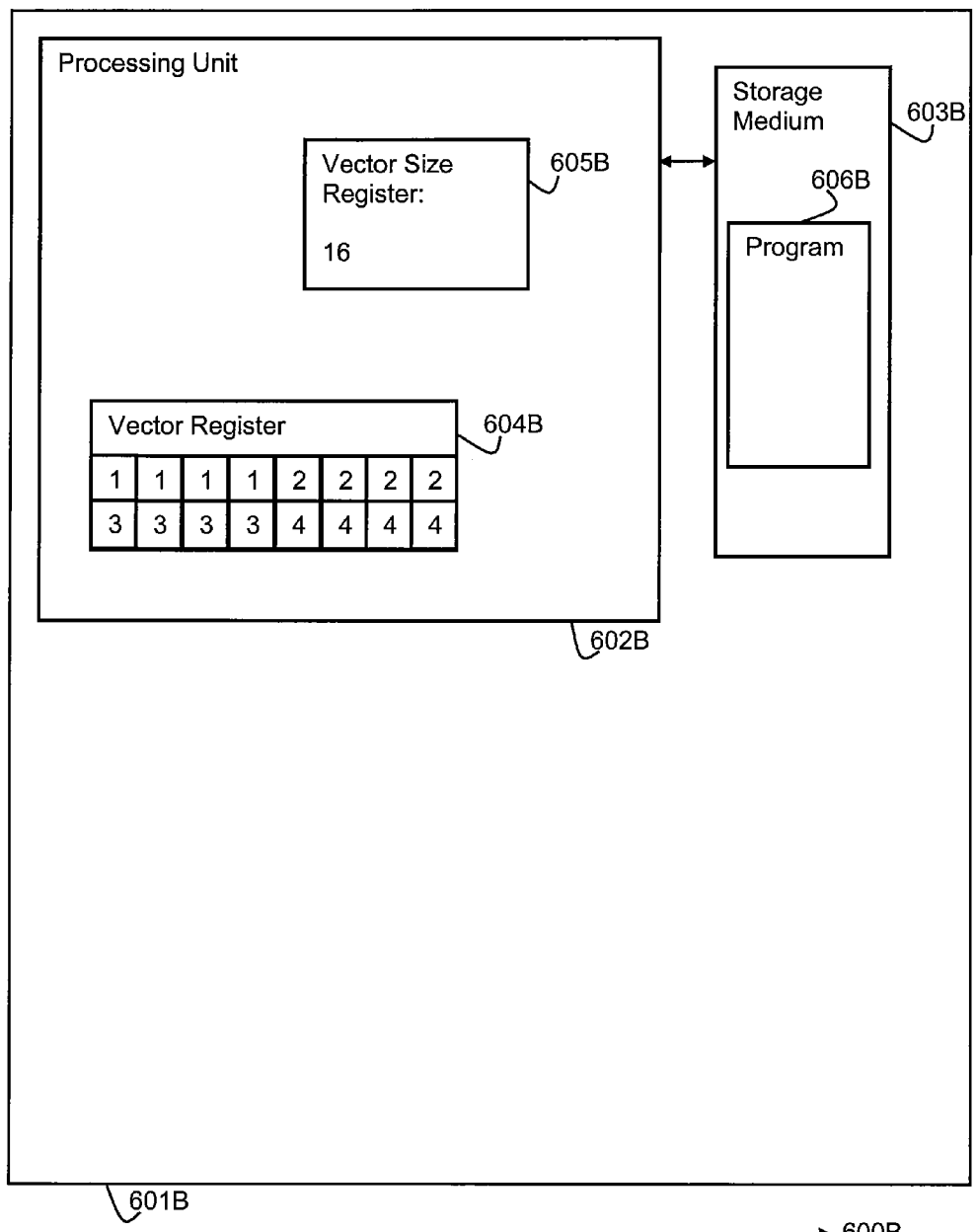
FIG. 6B is a block diagram illustrating the second example system 600B executing the code of FIG. 4C with a vector width of sixteen after loading all sixteen elements of array a into the vector register, in accordance with an embodiment of the present disclosure.
Figure 6C:
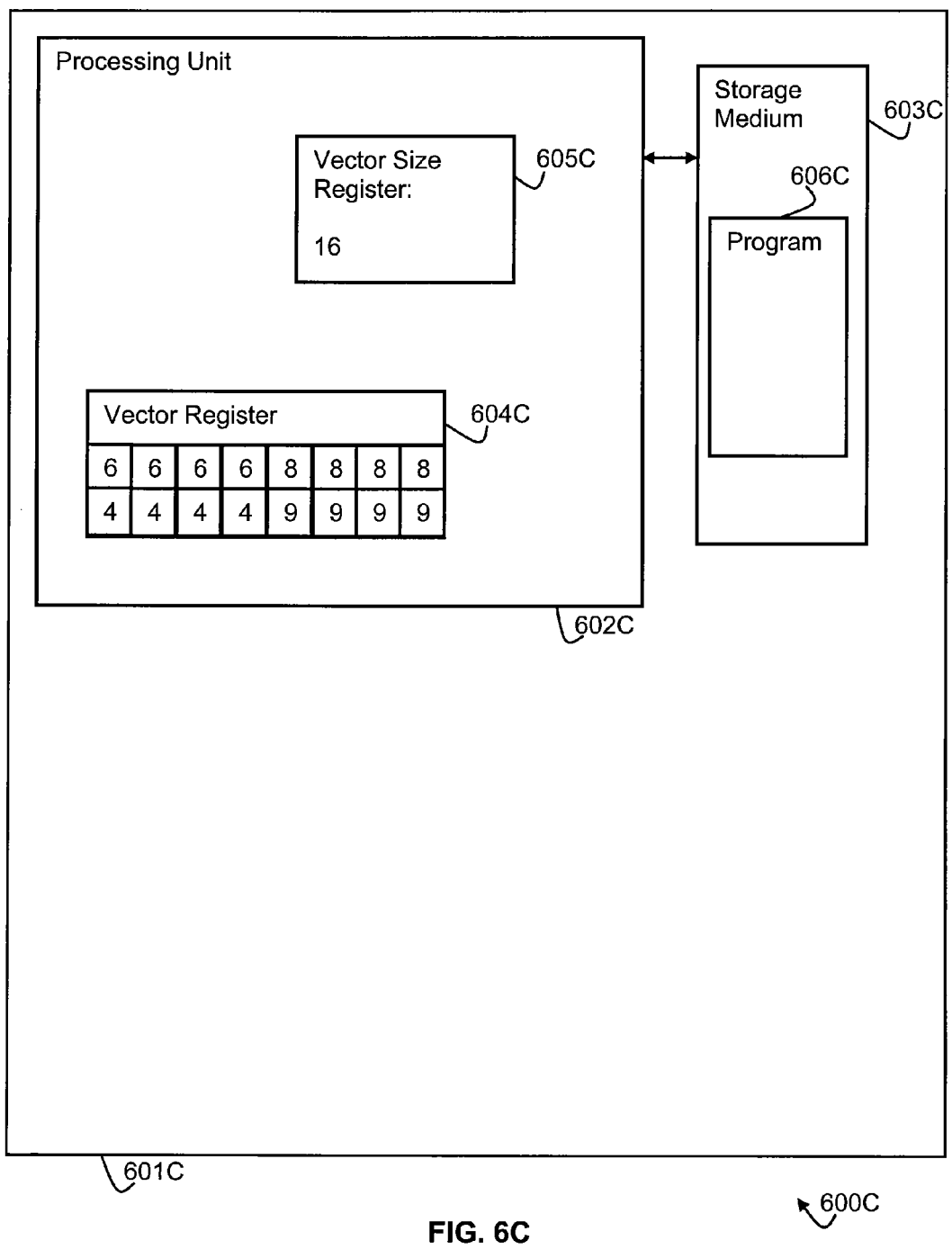
FIG. 6C is a block diagram illustrating the second example system 600C executing the code of FIG. 4C with a vector width of sixteen after adding all sixteen elements of array b to the vector register, in accordance with an embodiment of the present disclosure.

FIGS. 6A-6C are block diagrams illustrating a second sample system 600A-600C executing the code 400C with a vector processing instruction width of sixteen. As illustrated in FIG. 6A, the system 600A involves a computing device 601A that includes a processing unit 602A and a tangible machine-readable storage media 603A. The processing unit 602A includes a vector register 604A and a vector size register 605A. One or more vector registers 604A store one or more vectors during execution of vector processing instructions by the processing unit 602A. The vector size register 605A stores the width of the vector register 604A. As illustrated, the size of the vector register 604A is sixteen and the vector size register 605A stores the width of sixteen of the vector register 604A. The tangible machine-readable storage media 603A is operable to store a program 606A which is the code 400C.

The processing unit 602A executes the code 400C. The processing unit 602A executes the instruction that obtains the width, sixteen, of the vector register 604A as stored in the vector size register 605A and assigns that width to the variable v_size. The processing unit 602A then performs the inner for loop using vector processing instructions of width sixteen. As illustrated in FIG. 6B, the processing unit 602B loads all sixteen elements of array a into the vector register 604B. Next, as illustrated in FIG. 6C, the processing unit 602C adds all sixteen elements of array b to the vector register 604C before storing the resulting values to array c. As the vectors in this example include sixteen elements, the vectors are evenly divisible by sixteen and no vector elements would remain after execution of the first for loop. Thus, no vector elements remain for the second for loop to add.

Figure 6D:
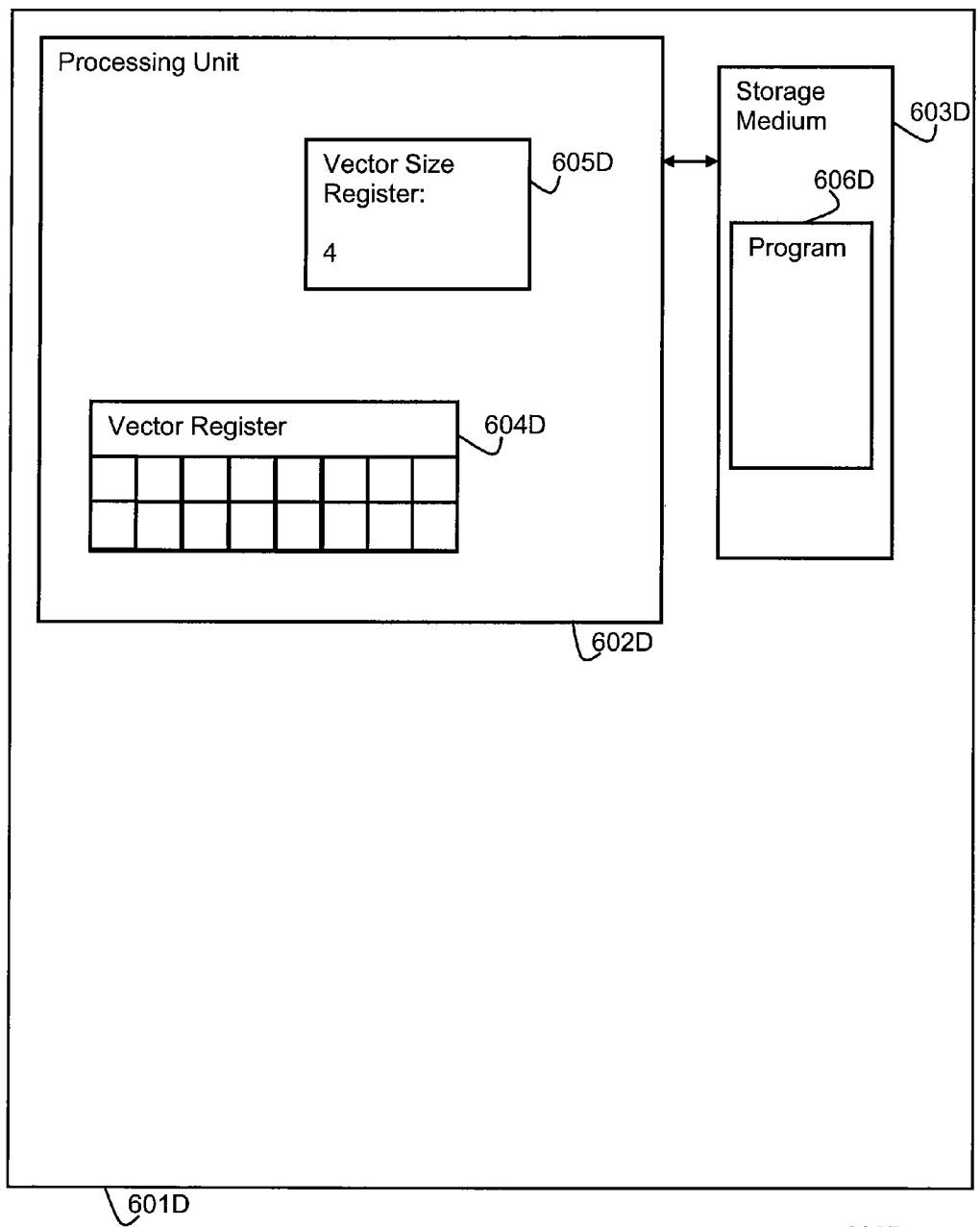
FIG. 6D is a block diagram illustrating the second example system 600D executing the code of FIG. 4C with a vector width of four, in accordance with an embodiment of the present disclosure.

FIGS. 6D-6L are block diagrams illustrating the second sample system 600D-600L executing the code 400C with a vector processing instruction width of four. As illustrated in FIG. 6D, the width of the vector register 604D is still sixteen. However, previous to executing the code 400C, the processing unit 602D sets the width of the vector register 602D stored in the vector size register 605D to four. Thus, when the processing unit 602D executes variable vector processing instructions, the processing unit 602D will process the variable vector processing instructions as vector processing instructions with a width of four utilizing only a portion of the vector register 604D.

Figure 6E:
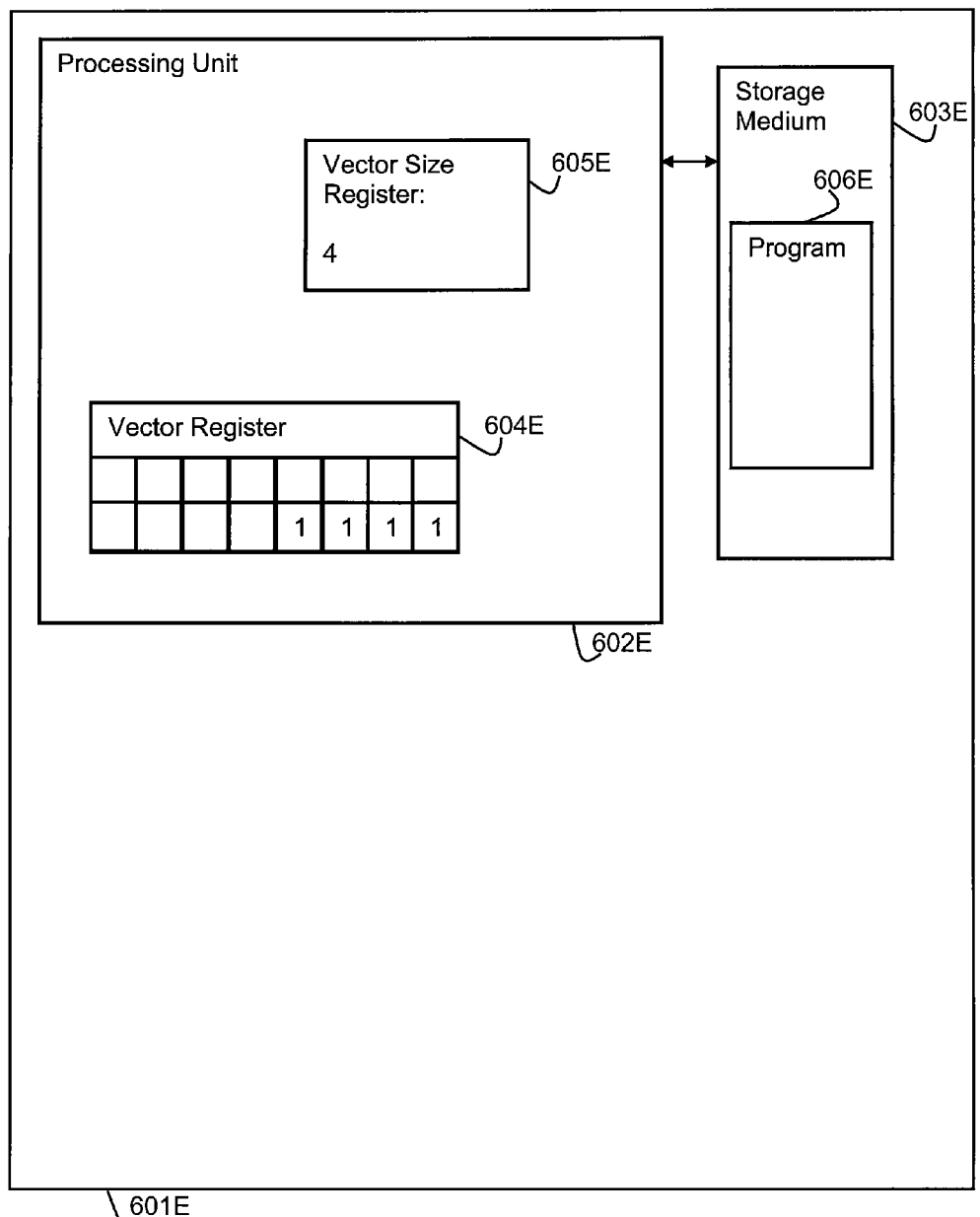
FIG. 6E is a block diagram illustrating the second example system 600E executing the code of FIG. 4C with a vector width of four after loading the first four elements of array a into the vector register, in accordance with an embodiment of the present disclosure.
Figure 6F:
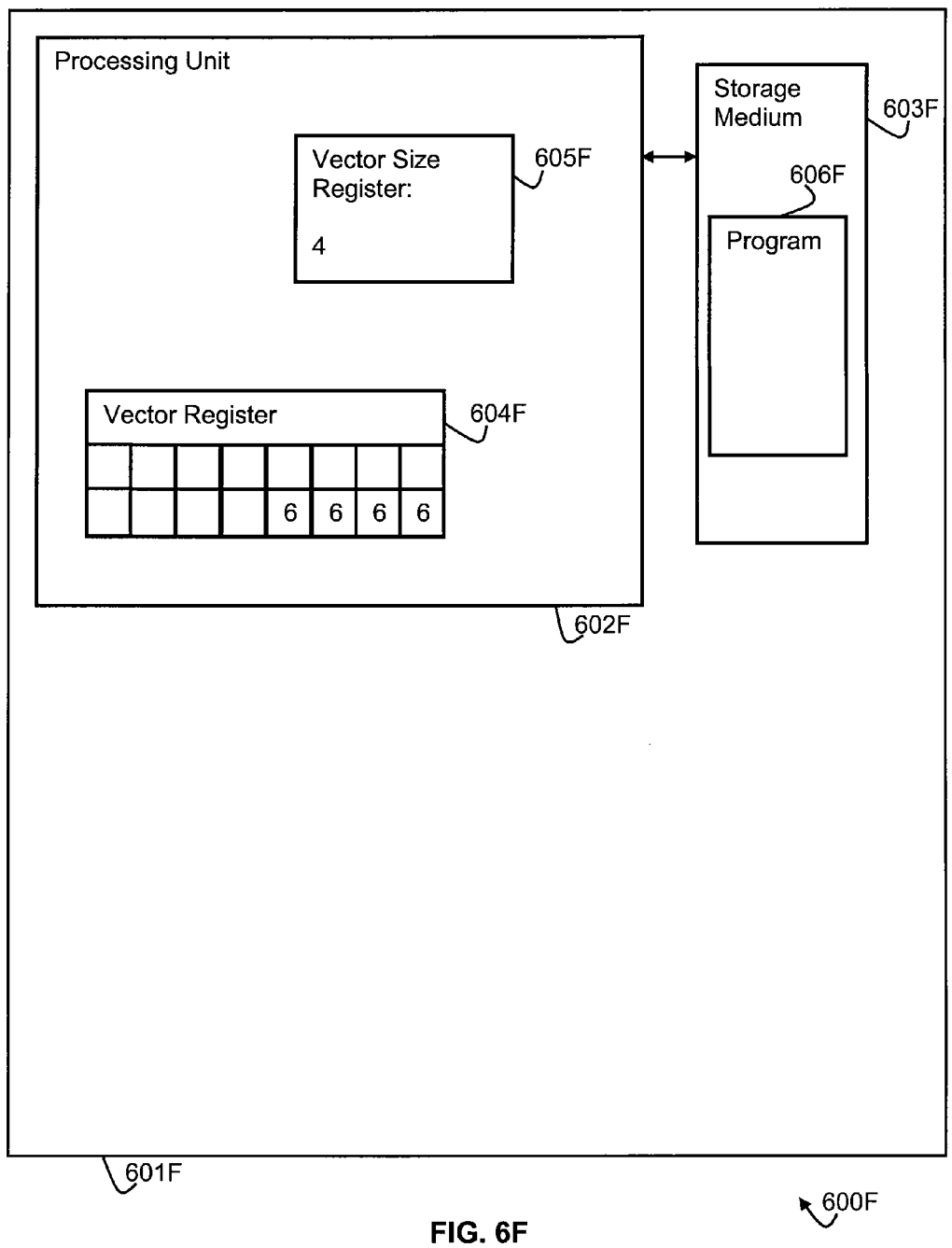
FIG. 6F is a block diagram illustrating the second example system 600F executing the code of FIG. 4C with a vector width of four after adding the first four elements of array b to the vector register, in accordance with an embodiment of the present disclosure.
Figure 6G:
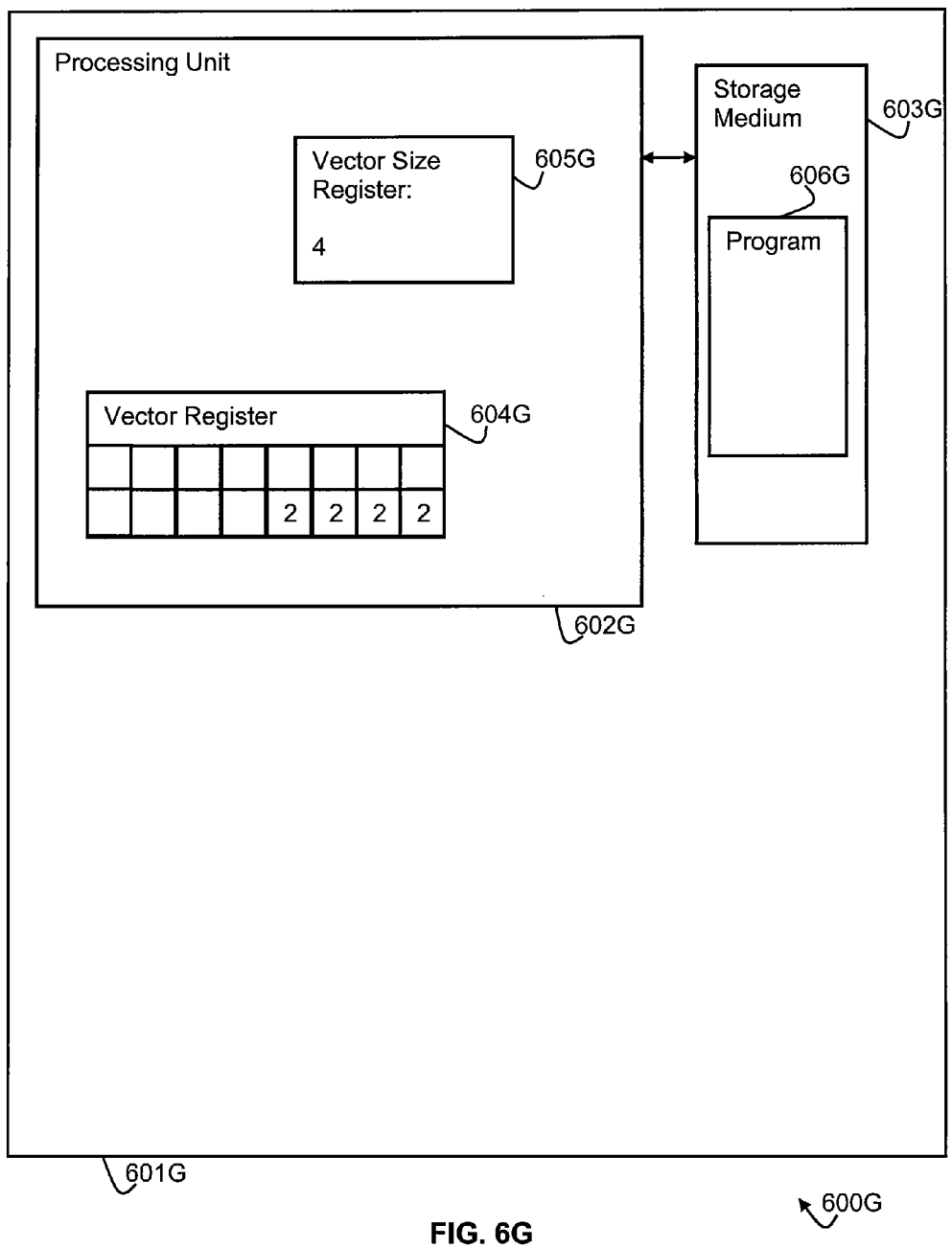
FIG. 6G is a block diagram illustrating the second example system 600G executing the code of FIG. 4C with a vector width of four after loading the second four elements of array a into the vector register, in accordance with an embodiment of the present disclosure.
Figure 6H:
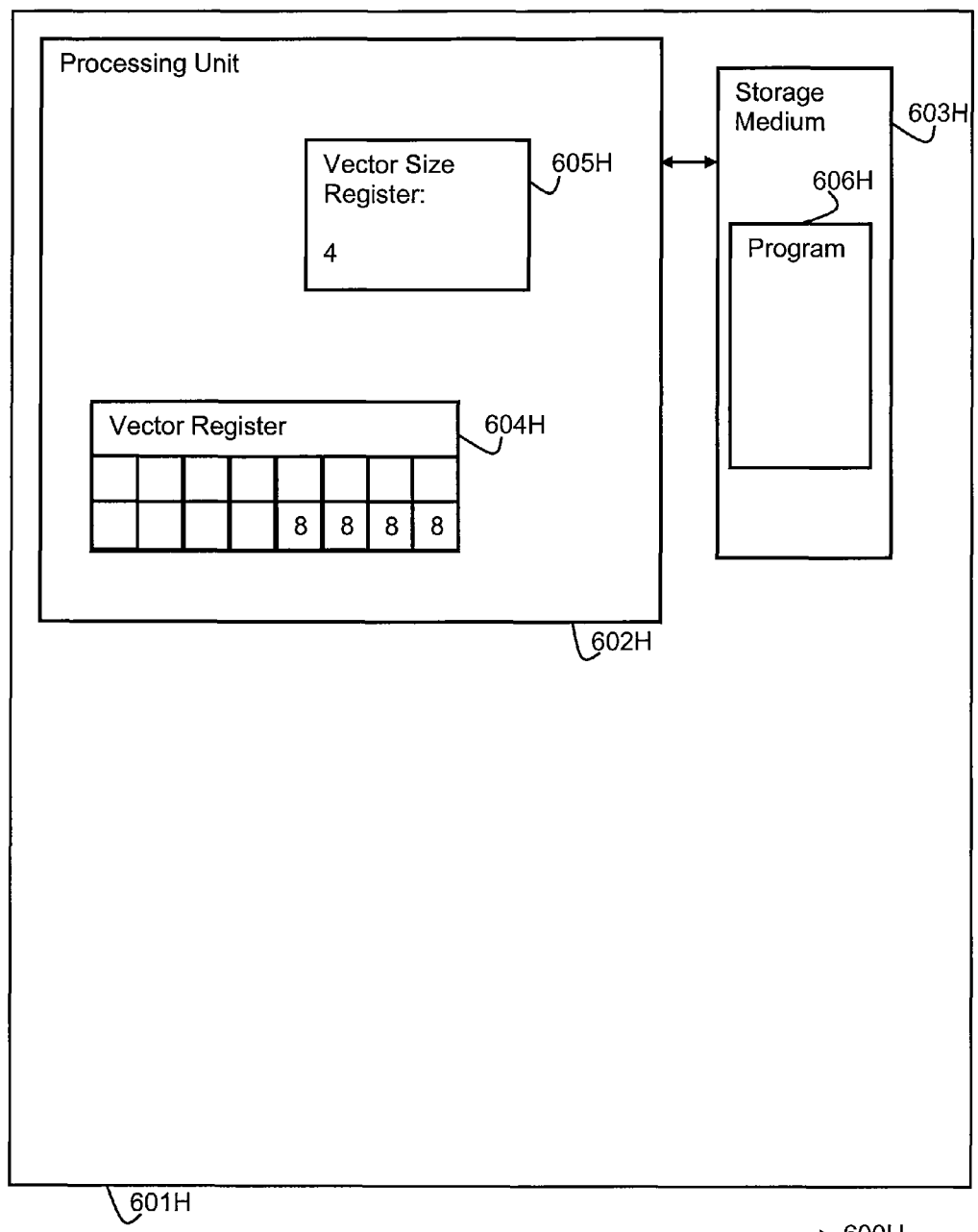
FIG. 6H is a block diagram illustrating the second example system 600H executing the code of FIG. 4C with a vector width of four after adding the second four elements of array b to the vector register, in accordance with an embodiment of the present disclosure.
Figure 6I:
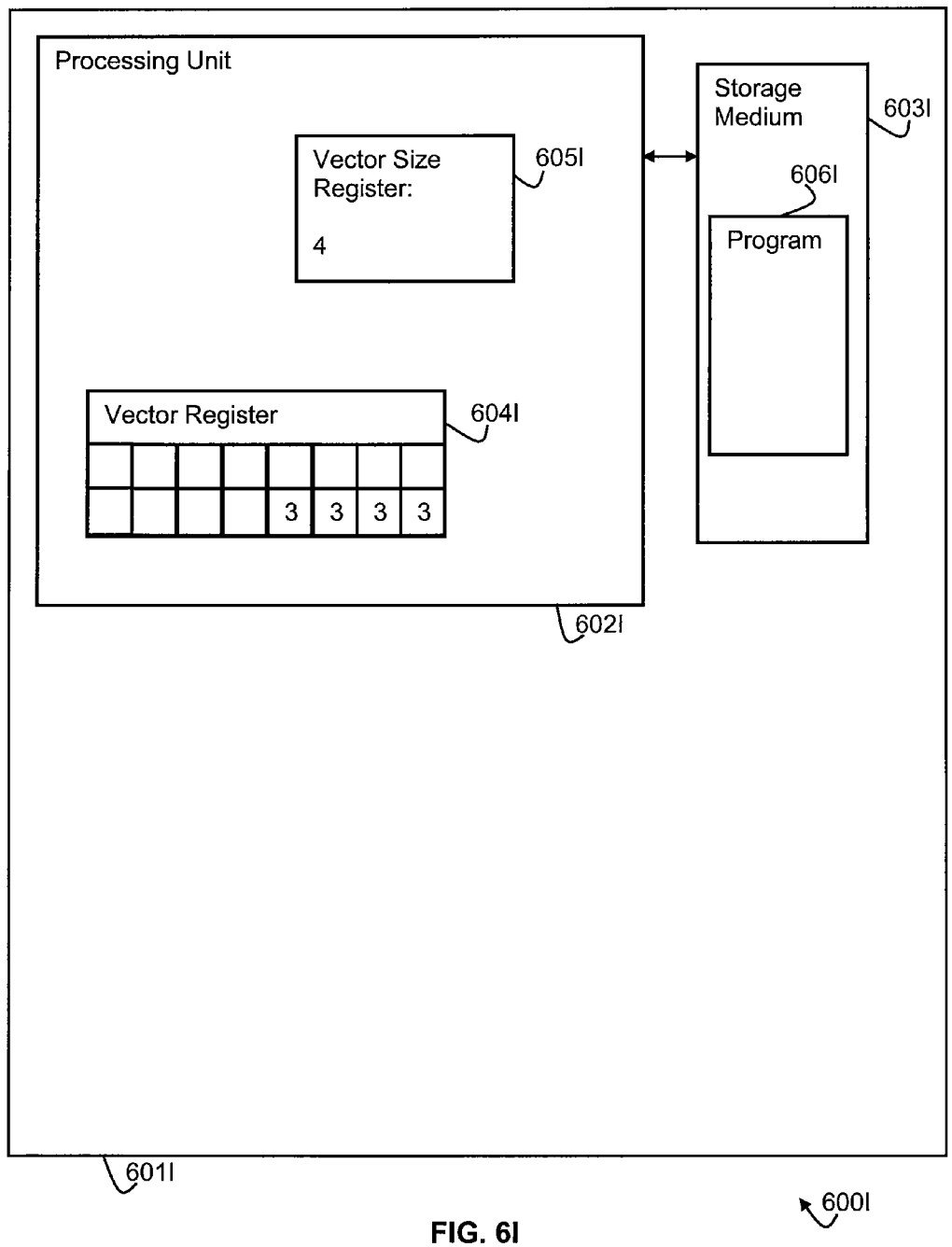
FIG. 6I is a block diagram illustrating the second example system 600I executing the code of FIG. 4C with a vector width of four after loading the third four elements of array a into the vector register, in accordance with an embodiment of the present disclosure.
Figure 6J:
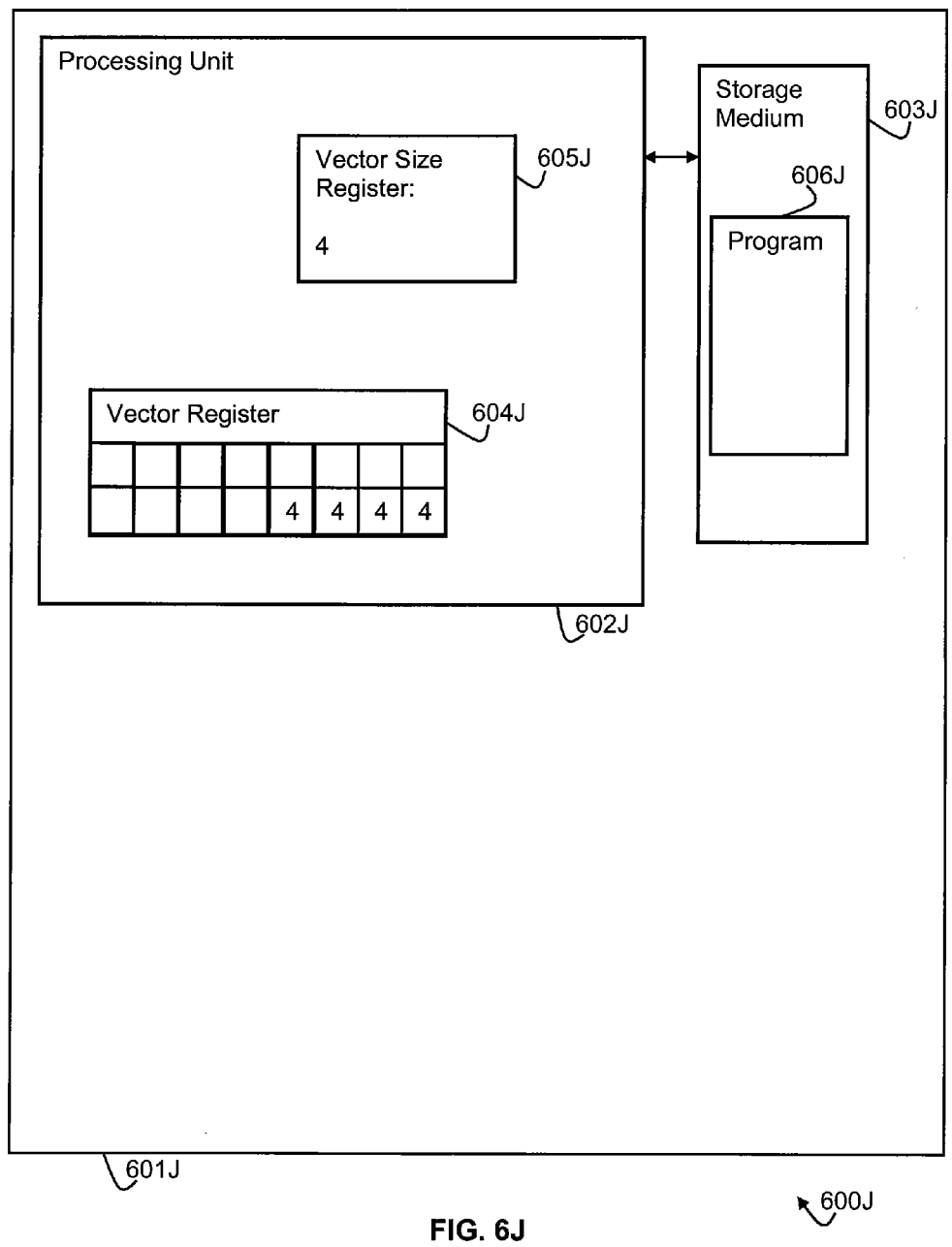
FIG. 6J is a block diagram illustrating the second example system 600J executing the code of FIG. 4C with a vector width of four after adding the third four elements of array b to the vector register, in accordance with an embodiment of the present disclosure.
Figure 6K:
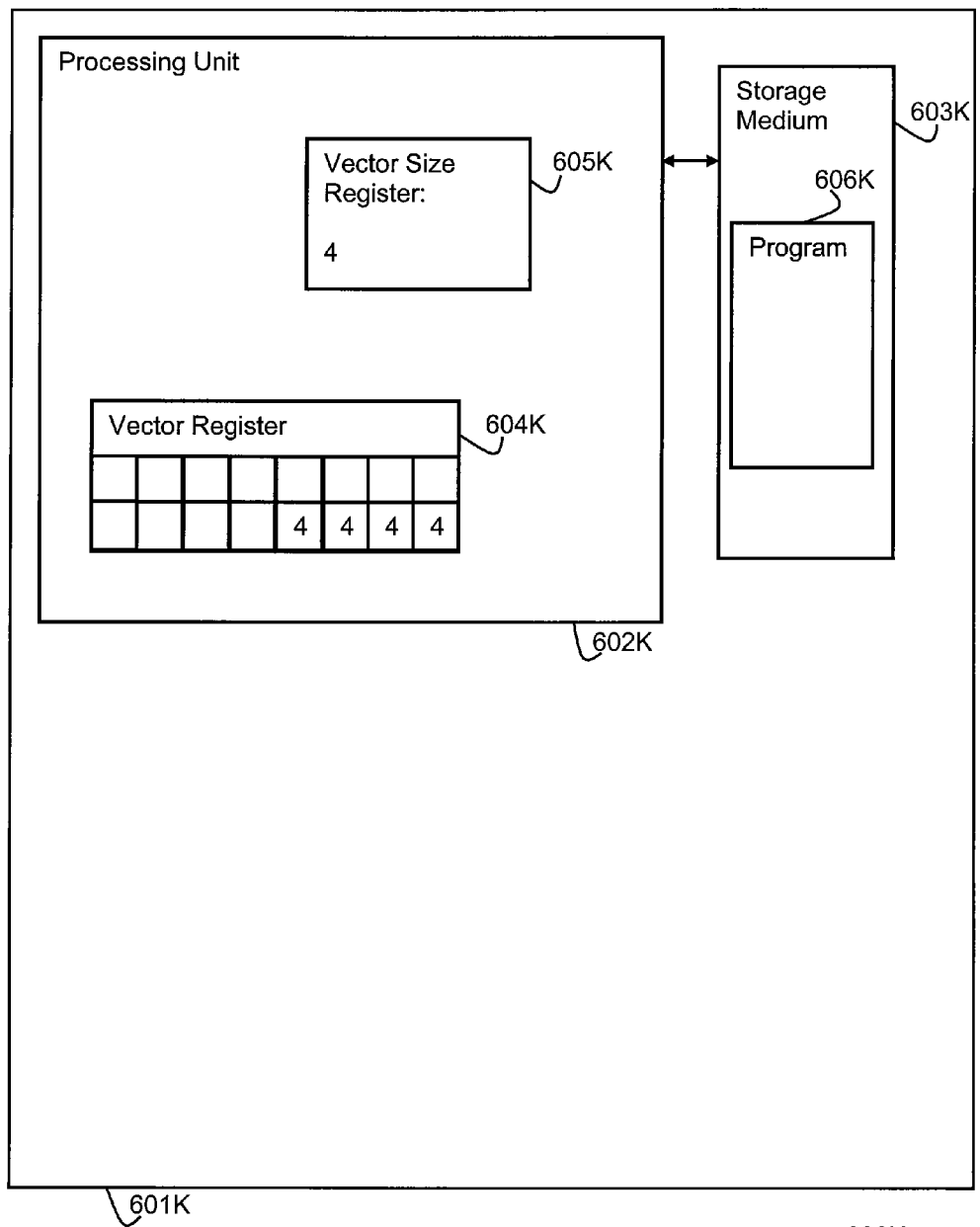
FIG. 6K is a block diagram illustrating the second example system 600K executing the code of FIG. 4C with a vector width of four after loading the final four elements of array a into the vector register, in accordance with an embodiment of the present disclosure.
Figure 6L:
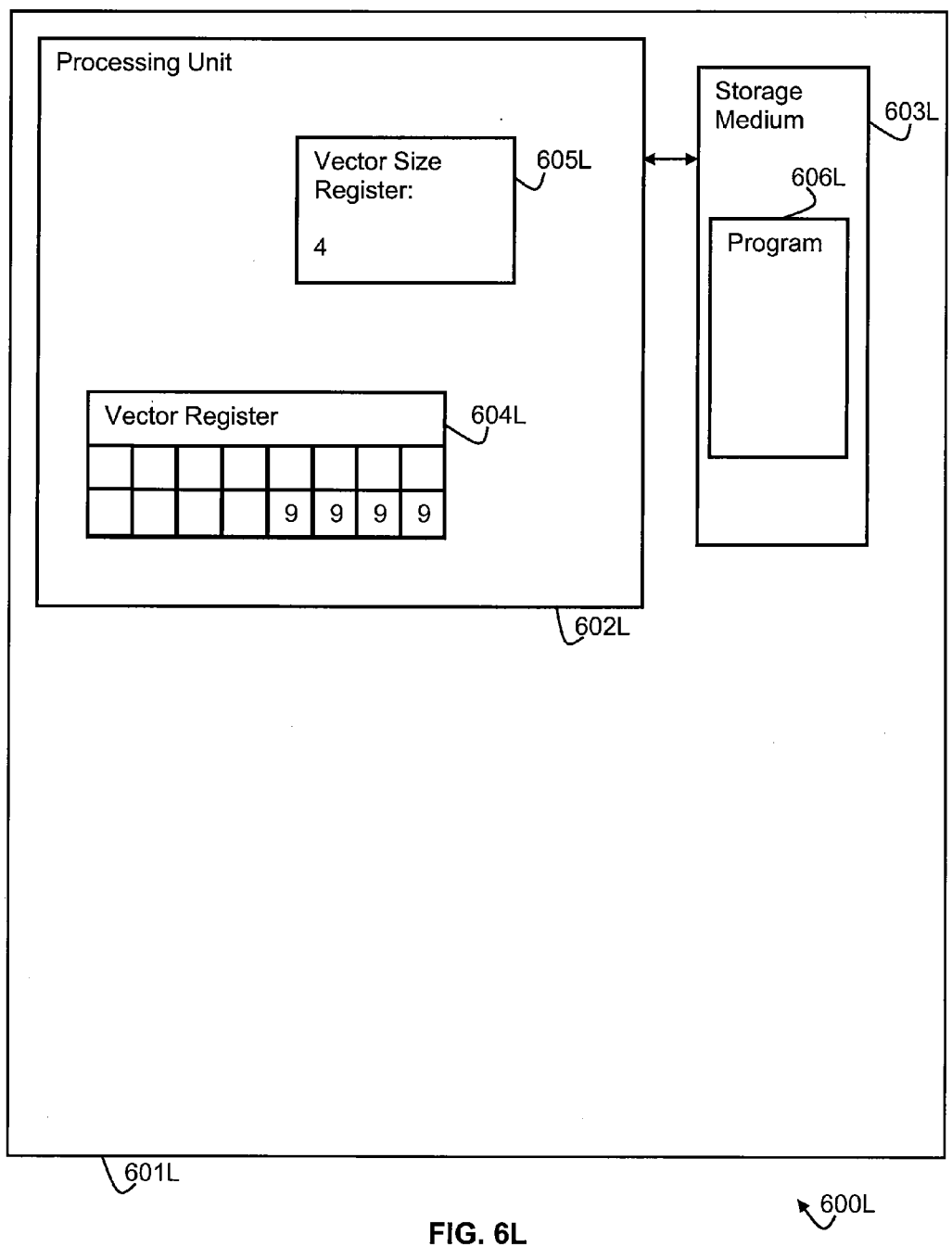
FIG. 6L is a block diagram illustrating the second example system 600L executing the code of FIG. 4C with a vector width of four after adding the final four elements of array b to the vector register, in accordance with an embodiment of the present disclosure.

The processing unit 602D executes the code 400C. The processing unit 602D executes the instruction that obtains the width, four, of the vector register 604D as stored in the vector size register 605D and assigns that width to the variable v_size. The processing unit 602D then performs the inner for loop using vector processing instructions of width four. As illustrated in FIG. 6E, the processing unit 602E loads the first four elements of array a into the vector register 604E. Next, as illustrated in FIG. 6F, the processing unit 602F adds the first four elements of array b to the vector register 604F before storing the resulting values to array c. Then, as illustrated in FIG. 6G, the processing unit 602G loads the second four elements of array a into the vector register 604G. Next, as illustrated in FIG. 6H, the processing unit 602H adds the second four elements of array b to the vector register 604H before storing the resulting values to array c. Then, as illustrated in FIG. 6I, the processing unit 602I loads the third four elements of array a into the vector register 604I. Next, as illustrated in FIG. 6J, the processing unit 602J adds the third four elements of array b to the vector register 604J before storing the resulting values to array c. Then, as illustrated in FIG. 6K, the processing unit 602K loads the final four elements of array a into the vector register 604K. Next, as illustrated in FIG. 6L, the processing unit 602L adds the final four elements of array b to the vector register 604L before storing the resulting values to array c. As the vectors in this example include sixteen elements, the vectors are evenly divisible by four and no vector elements would remain after execution of the first for loop. Thus, no vector elements remain for the second for loop to add.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readably by a machine (e.g., a computer). The machine-readable medium may include, but is not limited to, magnetic storage medium (e.g., floppy diskette), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A system for executing variable width vector processing instructions, comprising:
    at least one vector register with a configurable width, operable to store a vector;
    at least one processing unit, communicably coupled to the at least one vector register, operable to execute code of at least one program that includes at least one variable vector processing instruction, at least one vector register width instruction configured to allow the at least one processing unit to adjust the configurable width, and supplies a vector registry width of the at least one vector register in response to executing the at least one vector register width instruction;
    wherein the at least one processing unit processes the at least one variable vector processing instruction utilizing the at least one vector register with the configurable width set by the vector registry width supplied by the at least one processing unit.

2. The system of claim 1, further comprising:
    at least one vector register width register that stores the vector register width of the at least one vector register;
    wherein the at least one processing unit supplies the vector register width of the at least one vector register from the at least one vector register width register.

3. The system of claim 1, wherein the at least one vector register is comprised of a plurality of registers.

4. The system of claim 1, wherein the at least one processing unit is operable to utilize the at least one vector register as a non-vector register when executing a non-vector instruction.

5. The system of claim 1, wherein the vector register width of the at least one vector register supplied by the at least one processing unit is less than an actual register width of the at least one vector register.

6. The system of claim 5, wherein the processing unit is operable to set the vector register width of the at least one vector register as less than the actual width of the at least one vector register.

7. The system of claim 1, wherein the at least one processing unit is operable to align a vector stored in the at least one vector register as part of processing the at least one variable vector processing instruction.

8. The system of claim 1, wherein the at least one variable vector processing instruction comprises at least one of a vector add instruction, a vector subtract instruction, a vector multiply instruction, a vector divide instruction, a vector and instruction, a vector or instruction, or a vector xor instruction.

9. The system of claim 1, wherein the at least one variable vector processing instruction comprises at least one of a vector rotate instruction, a vector load instruction, a vector store instruction, a vector element extraction instruction, a scalar expansion instruction, or a vector reduction instruction.

10. The system of claim 1, further comprising:
    at least one tangible storage media, communicably coupled to the at least one processing unit, that stores the code of the at least one program.

11. A method for variable length vector operation instruction processing, comprising:
    obtaining a vector register width of at least one vector register during execution of code of a program utilizing at least one processing unit by executing at least one vector register width instruction in the code;
    executing at least one variable vector processing instruction in the code utilizing the at least one processing unit; and
    processing the at least one variable vector processing instruction utilizing the at least one vector register with a vector width of the obtained vector register width of the at least one vector register.

12. The method of claim 11, wherein said obtaining a vector register width of at least one vector register during execution of code of a program utilizing at least one processing unit by executing at least one vector register width instruction in the code comprises:
    obtaining the vector register width of the vector register from at least one vector register width register of the at least one processing unit that stores the vector register width of the vector register.

13. The method of claim 11, wherein the width of the at least one vector register is less than an actual width of the at least one vector register, further comprising:
    setting the width of the at least one vector register as less than the actual width of the at least one vector register utilizing the at least one processing unit.

14. The method of claim 11, wherein the at least one variable vector processing instruction comprises at least one of a vector add instruction, a vector subtract instruction, a vector multiply instruction, a vector divide instruction, a vector and instruction, a vector or instruction, or a vector xor instruction.

15. The method of claim 11, wherein the at least one variable vector processing instruction comprises at least one of a vector rotate instruction, a vector load instruction, a vector store instruction, a vector element extraction instruction, a scalar expansion instruction, or a vector reduction instruction.

16. The method of claim 11, wherein said processing the at least one variable vector processing instruction utilizing the at least one vector register with a vector width of the obtained width of the at least one vector register comprises:
aligning a vector stored in the at least one vector register.

17. The method of claim 11, further comprising:
utilizing the at least one vector register as a non-vector register when executing a non-vector instruction utilizing the at least one processing unit.

18. The method of claim 11, further comprising:
executing the code utilizing at least one additional processor including at least one additional vector register that has a different width than the at least one vector register.

19. The method of claim 11, further comprising:
inserting the at least one vector register width instruction and the at least one variable vector processing instruction in the code during compilation.

20. A computer program product, comprising:
a first set of instructions, stored in at least one non-transitory computer readable storage medium, executable by at least one processing unit to obtain a width of at least one vector register during execution of code of a program by executing at least one vector register width instruction in the code; and
a second set of instructions, stored in the at least one non-transitory computer readable storage medium, executable by the at least one processing unit to execute at least one variable vector processing instruction in the code and process the at least one variable vector processing instruction utilizing the at least one vector register with a vector width of the obtained width of the at least one vector register.

* * * * *